April 21, 1942.                B. A. SCHMITTER                2,280,665
                        TUBE AND BULB ASSEMBLING MACHINE
                      Filed May 26, 1938        11 Sheets-Sheet 1

Inventor
BERNARD A. SCHMITTER
By P. L. Young
Attorney

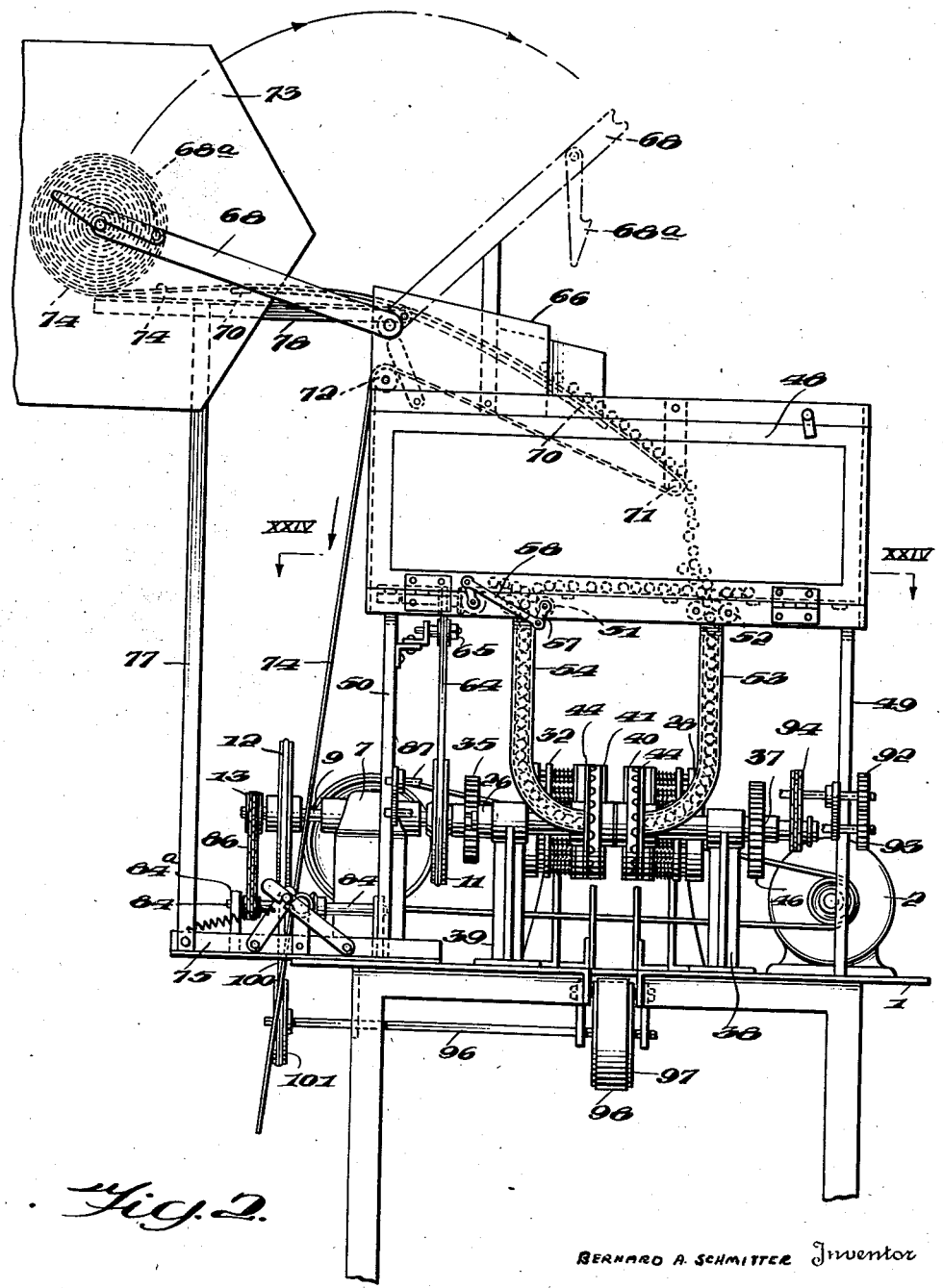

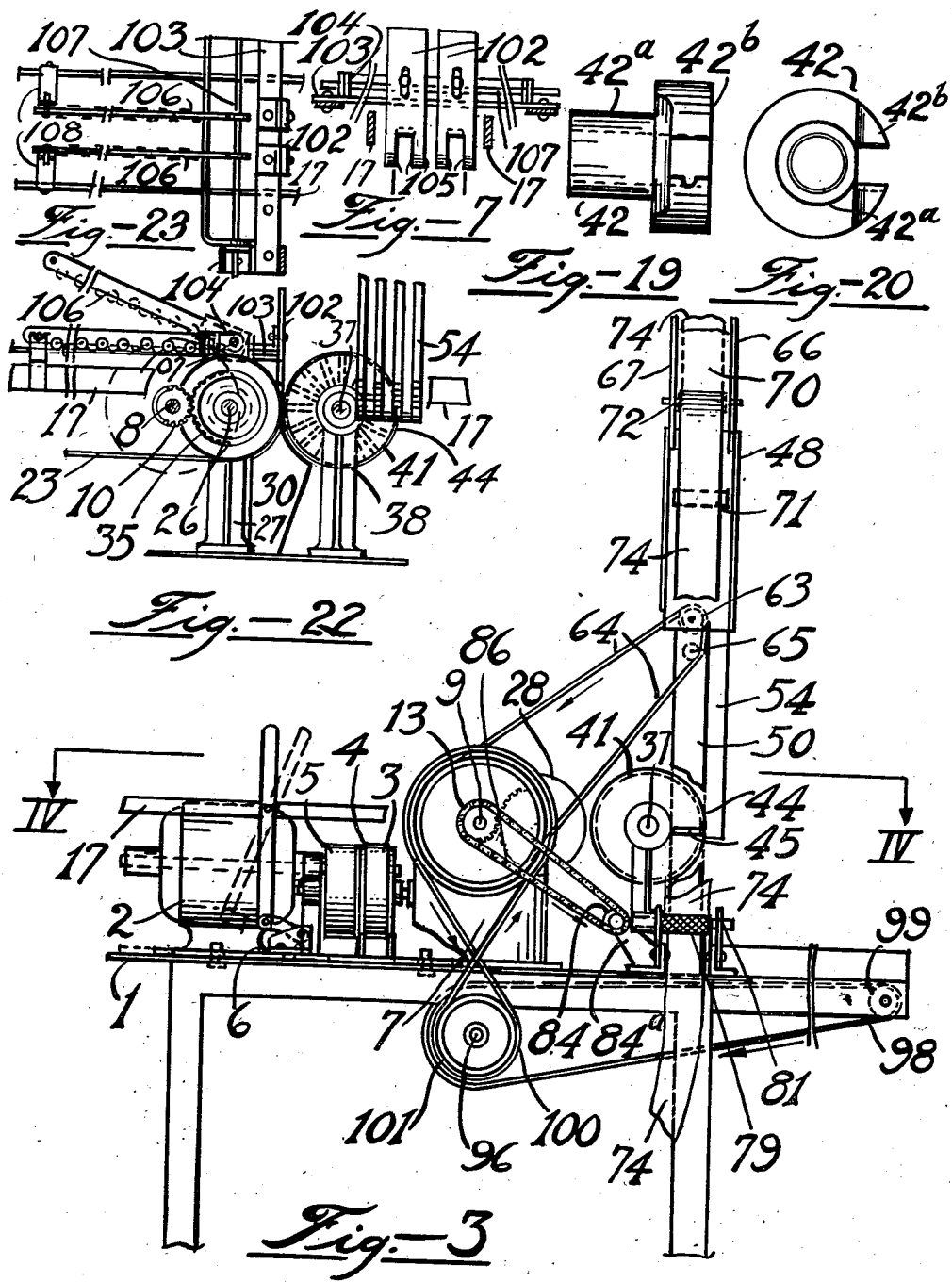

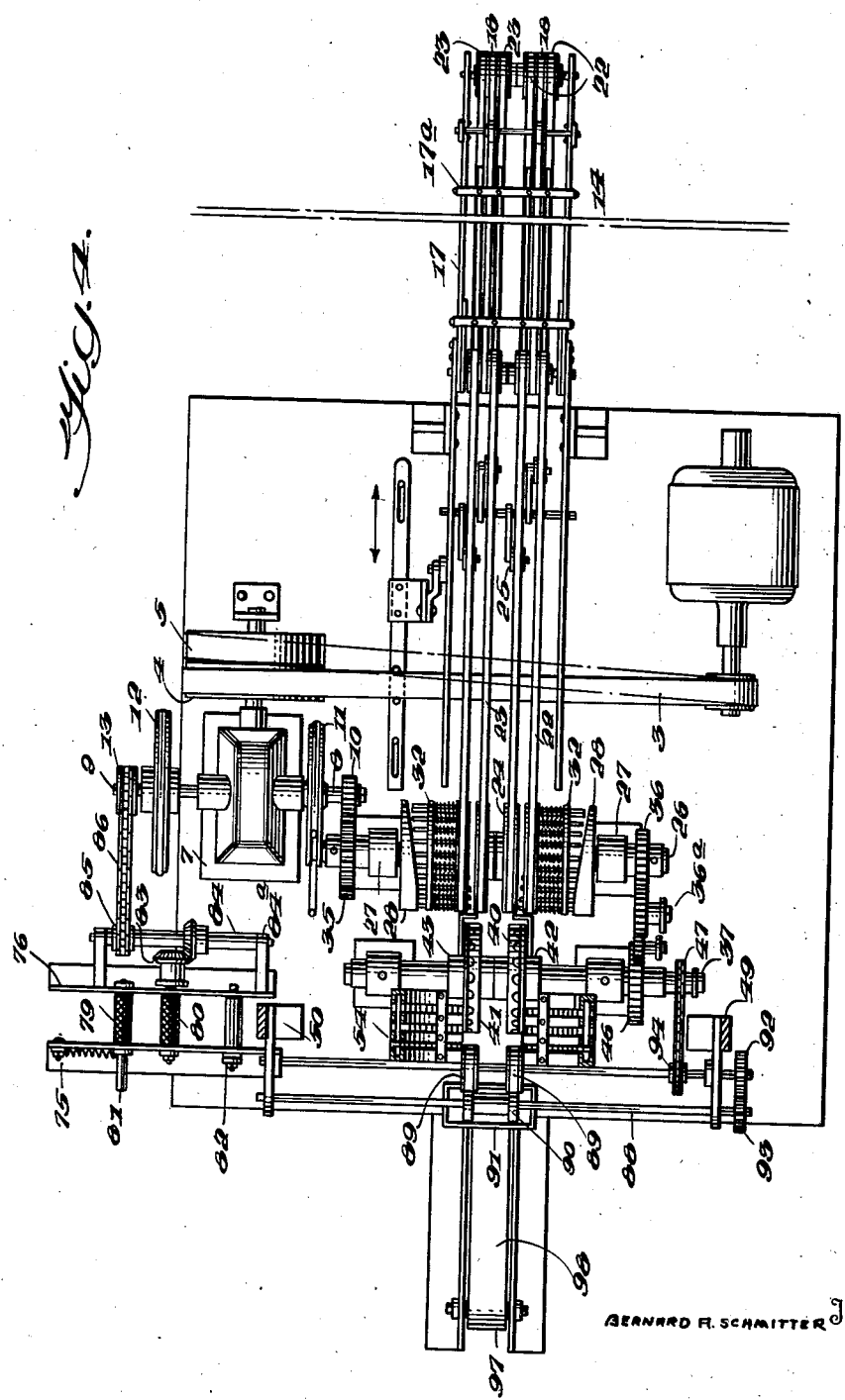

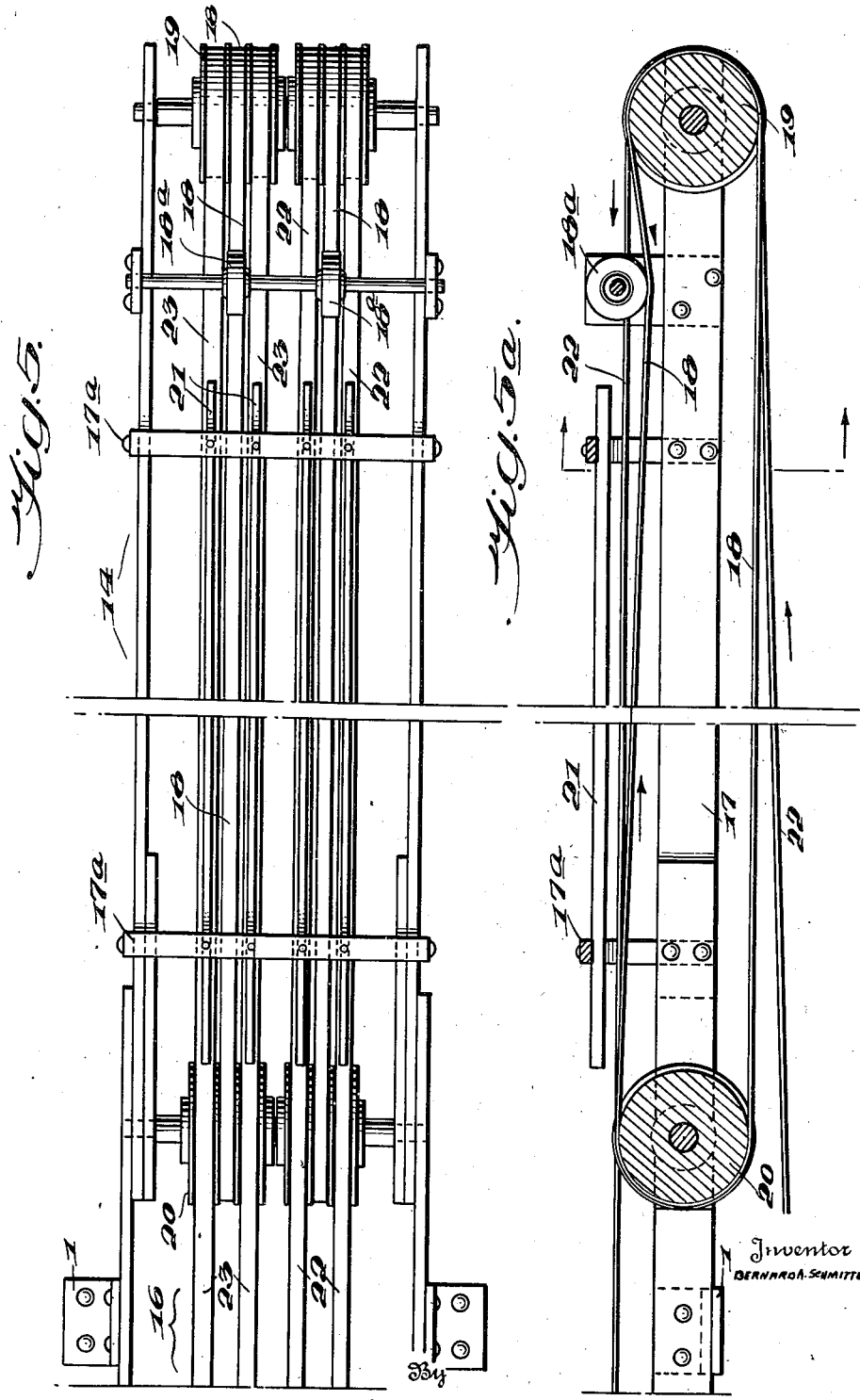

April 21, 1942.  B. A. SCHMITTER  2,280,665
TUBE AND BULB ASSEMBLING MACHINE
Filed May 26, 1938  11 Sheets-Sheet 6

Inventor
BERNARD A. SCHMITTER
By P. L. Young
Attorney

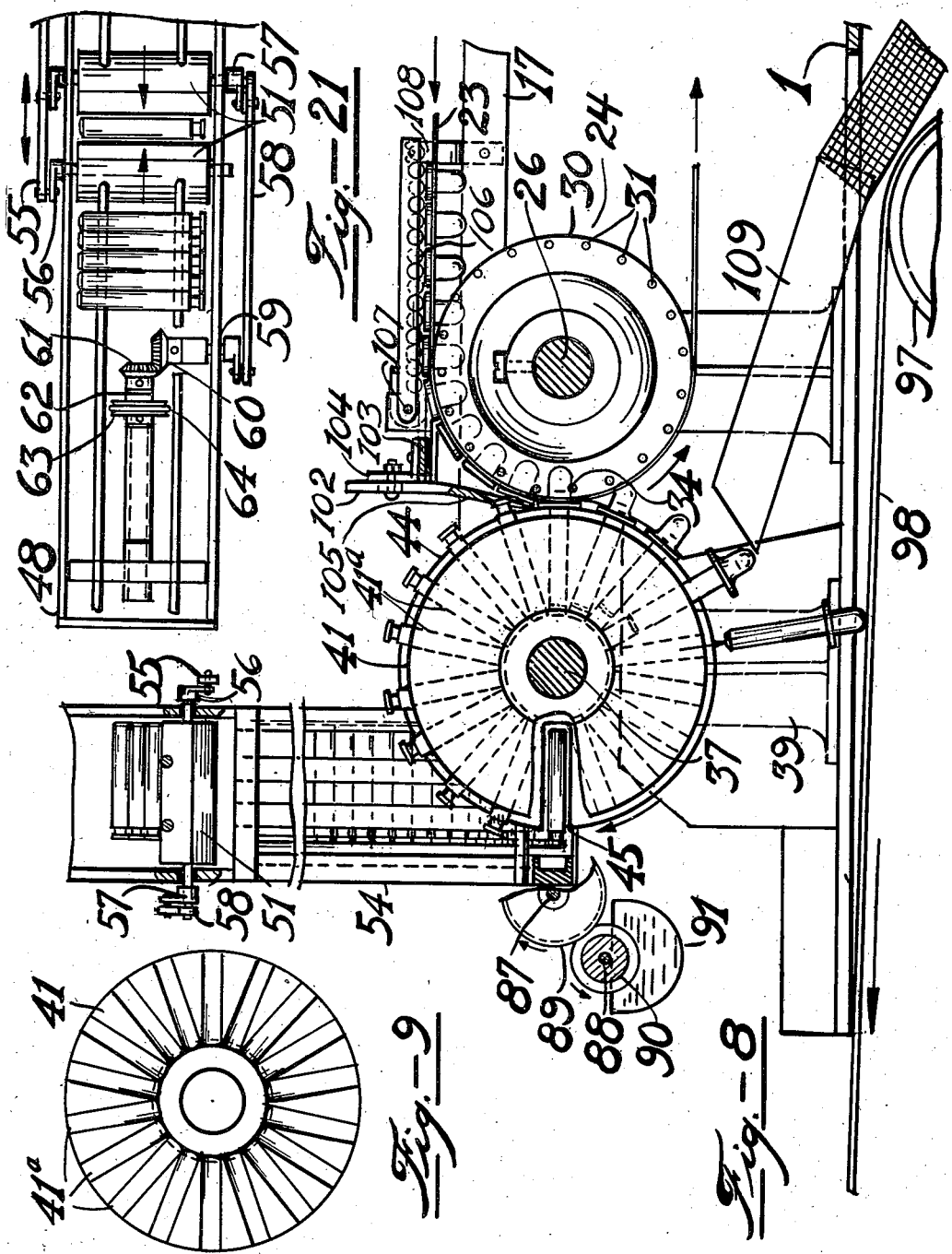

April 21, 1942. B. A. SCHMITTER 2,280,665
TUBE AND BULB ASSEMBLING MACHINE
Filed May 26, 1938 11 Sheets-Sheet 8
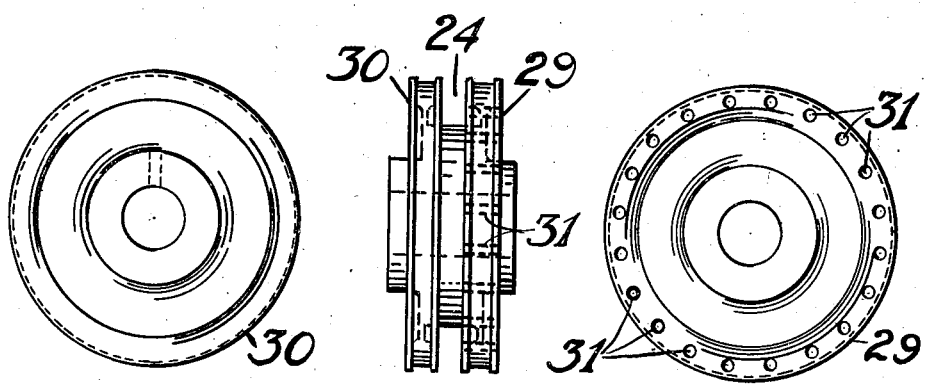
Fig.-10  Fig.-11  Fig.-12
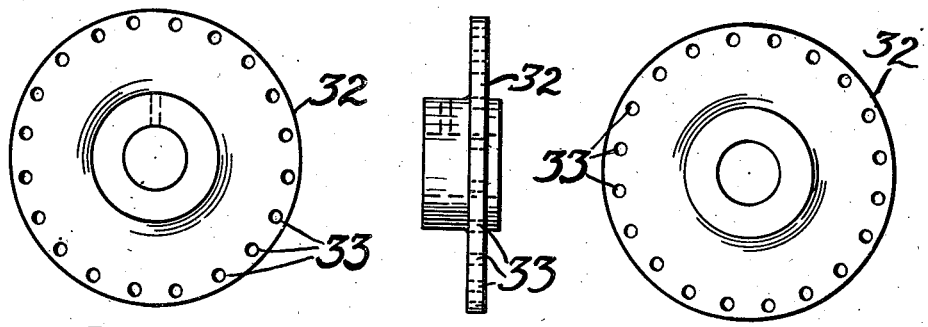
Fig.-13  Fig.-14  Fig.-15
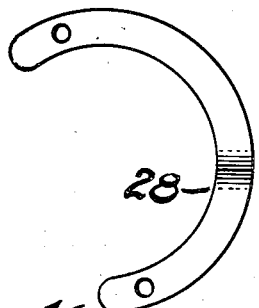  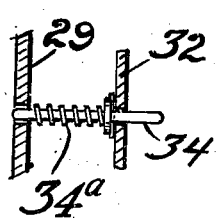
Fig.-16  Fig.-17  Fig.-18
Bernard A. Schmitter Inventor
By P. L. Young Attorney

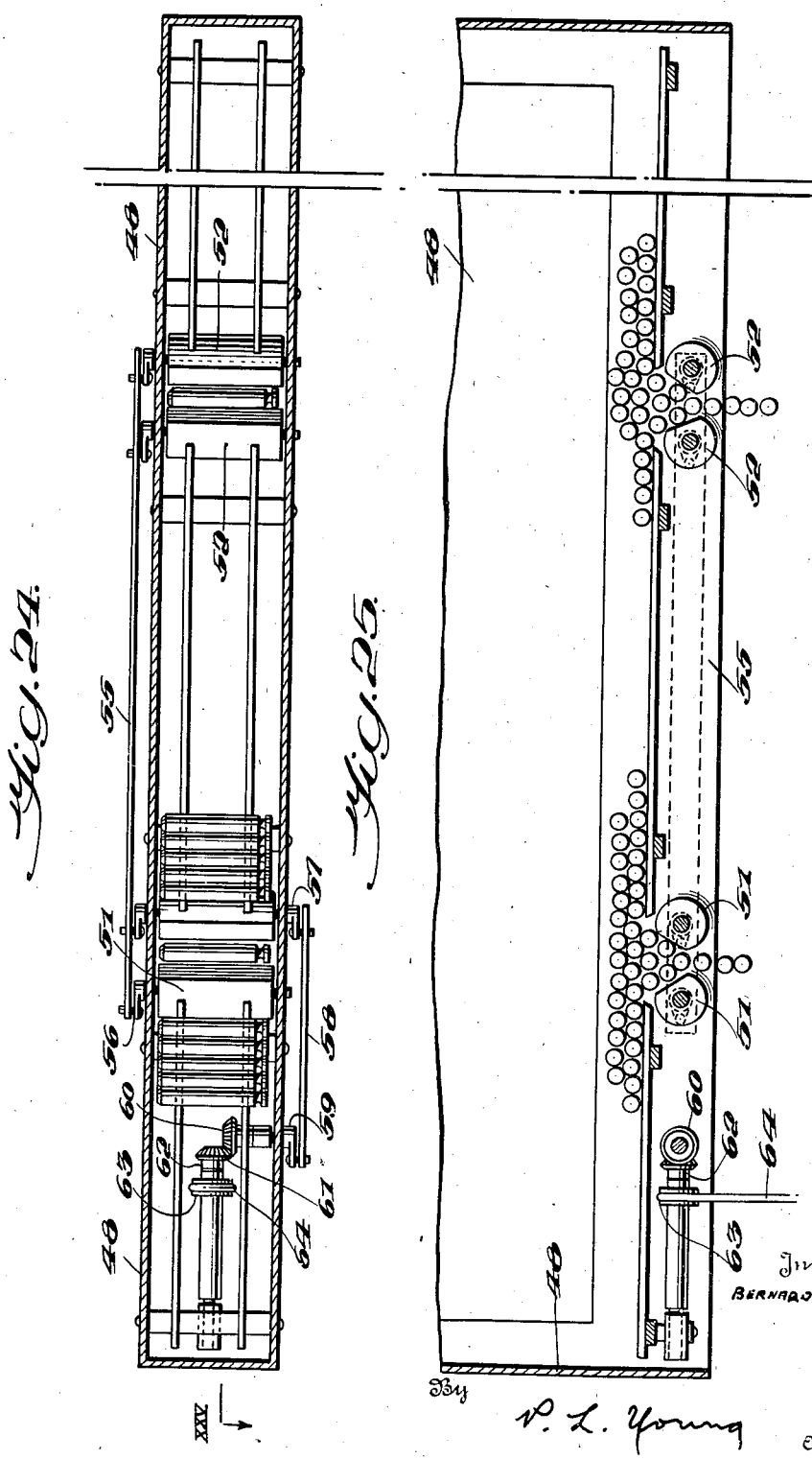

April 21, 1942.  B. A. SCHMITTER  2,280,665
TUBE AND BULB ASSEMBLING MACHINE
Filed May 26, 1938 11 Sheets-Sheet 10

Bernard A. Schmitter Inventor
By P. L. Young.
Attorney

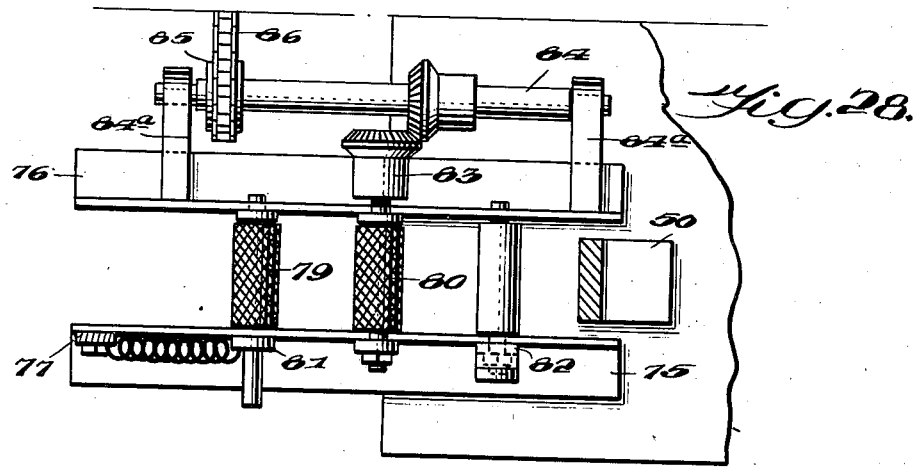
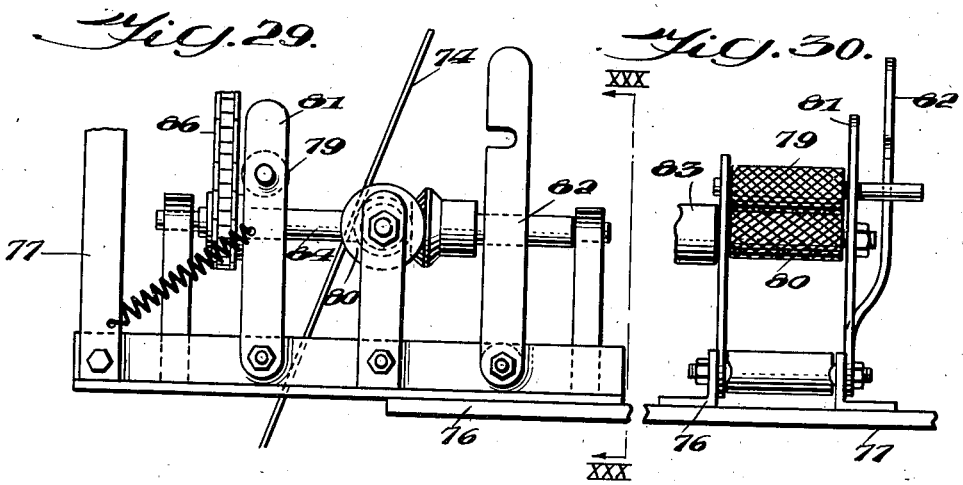
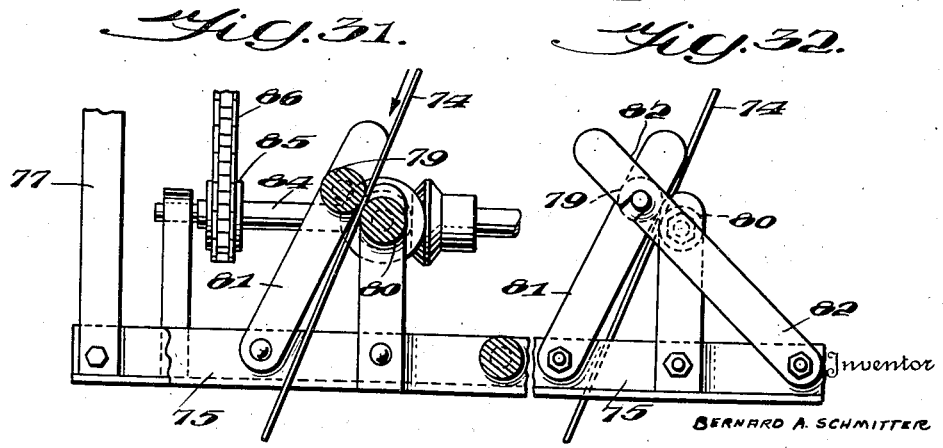

Patented Apr. 21, 1942

2,280,665

UNITED STATES PATENT OFFICE 2,280,665

TUBE AND BULB ASSEMBLING MACHINE

Bernard A. Schmitter, Rahway, N. J., assignor to Stanco, Incorporated

Application May 26, 1938, Serial No. 210,290

4 Claims. (Cl. 29—84)

This invention relates to the structure and operation of an assembling machine. More particularly, it relates to a machine for assembling the component parts of tubular articles such as medicine droppers and the like.

In its preferred embodiment, the machine is especially adapted for accomplishing the telescopic association of a tube of glass or other hard materials with a flexible bulb of rubber or the like.

Other objects will be apparent and the invention may be fully understood from the specifications when read in conjunction with the accompanying drawings, in which:

Fig. 2 is an end elevation of the apparatus with parts broken away.

Fig. 3 is a side elevation of the apparatus from the driving side.

Fig. 4 is a plan view of the apparatus along the line IV—IV of Fig. 3.

Figure 5B:
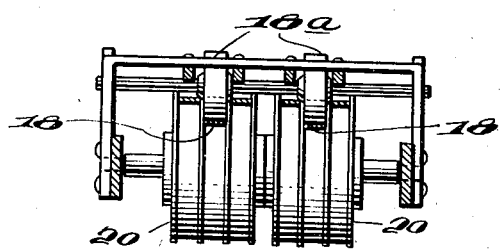
Fig. 5 is a detailed plan view of the feed conveyors for the bulbs.

Fig. 5—a is a side elevational view of the structure shown in Fig. 5.

Fig. 5—b is a transverse sectional view taken along the line V—V of Fig. 5.

Figure 6:
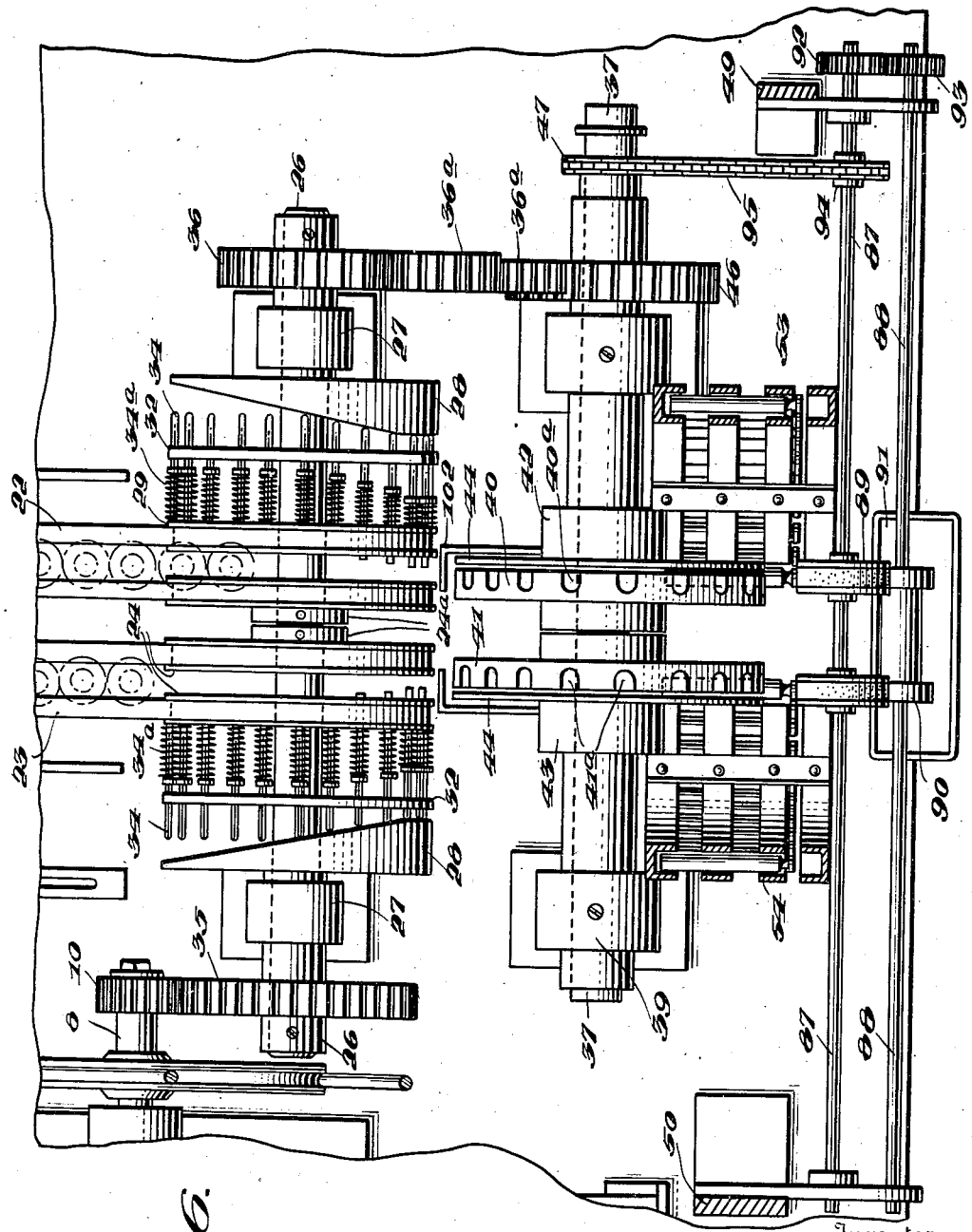

Fig. 6 is an enlarged plan view of the assembly mechanism.

Fig. 7 is a detailed view of the bulb retainer members.

Fig. 8 is an enlarged sectional view of the assembly mechanism along the line VIII—VIII of Fig. 6.

Fig. 9 is an enlarged view of the face of a tube holder.

Figs. 10, 11 and 12 are enlarged views of a pulley for the bulb carrier tape, forming part of the assembly mechanism.

Figs. 13, 14 and 15 are enlarged views of a plunger guide.

Figs. 16 and 17 are enlarged views of a plunger cam.

Fig. 18 is an enlarged view of the plunger assembly partly in section.

Figs. 19 and 20 are enlarged side and end views, respectively, of sleeves used to support the tube-chutes.

Fig. 21 is an enlarged view of a portion of the tube case showing the closure rollers for one tube chute and the operating mechanism therefor.

Figs. 22 and 23 are side elevational and plan views of roller guides for bulbs.

Fig. 24 is a transverse sectional view taken along the line XXIV—XXIV of Fig. 2, showing the structure for feeding the tubes from the tube case.

Fig. 25 is a sectional view taken along the line XXV—XXV of Fig. 24.

Figure 26:
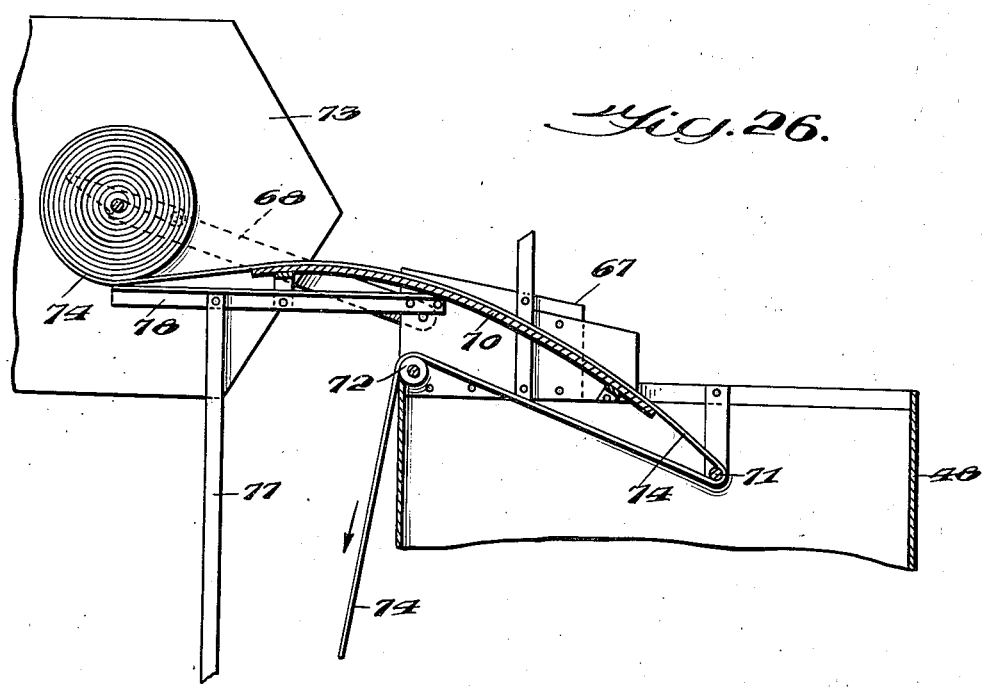

Fig. 26 is a detail view of the structure for feeding the tubes to the tube case.

Figure 27:
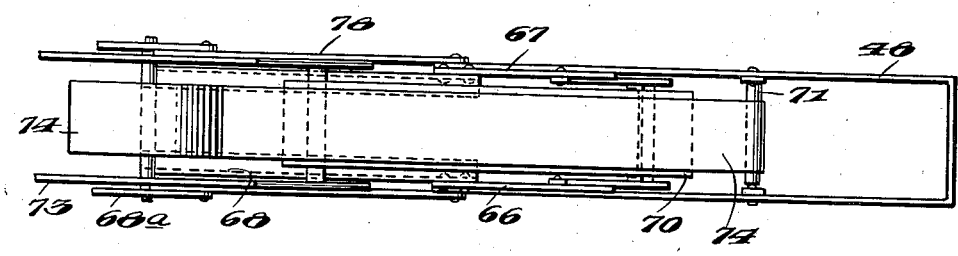

Fig. 27 is a top plan view of the structure illustrated in Fig. 26.

Fig. 28 is a top plan view of the roller mechanism for driving the tape to feed the tubes into the tube case.

Fig. 29 is a side elevational view of the structure illustrated in Fig. 28.

Fig. 30 is an end elevational view looking in the direction XXX—XXX of Fig. 29.

Fig. 31 is a side elevational view corresponding to Fig. 29, but showing the rollers 79 and 80 in operative position; and Fig. 32 is an end view corresponding to Fig. 29, showing the latch in position to hold the rollers in engagement against the tape.

Figure 1:
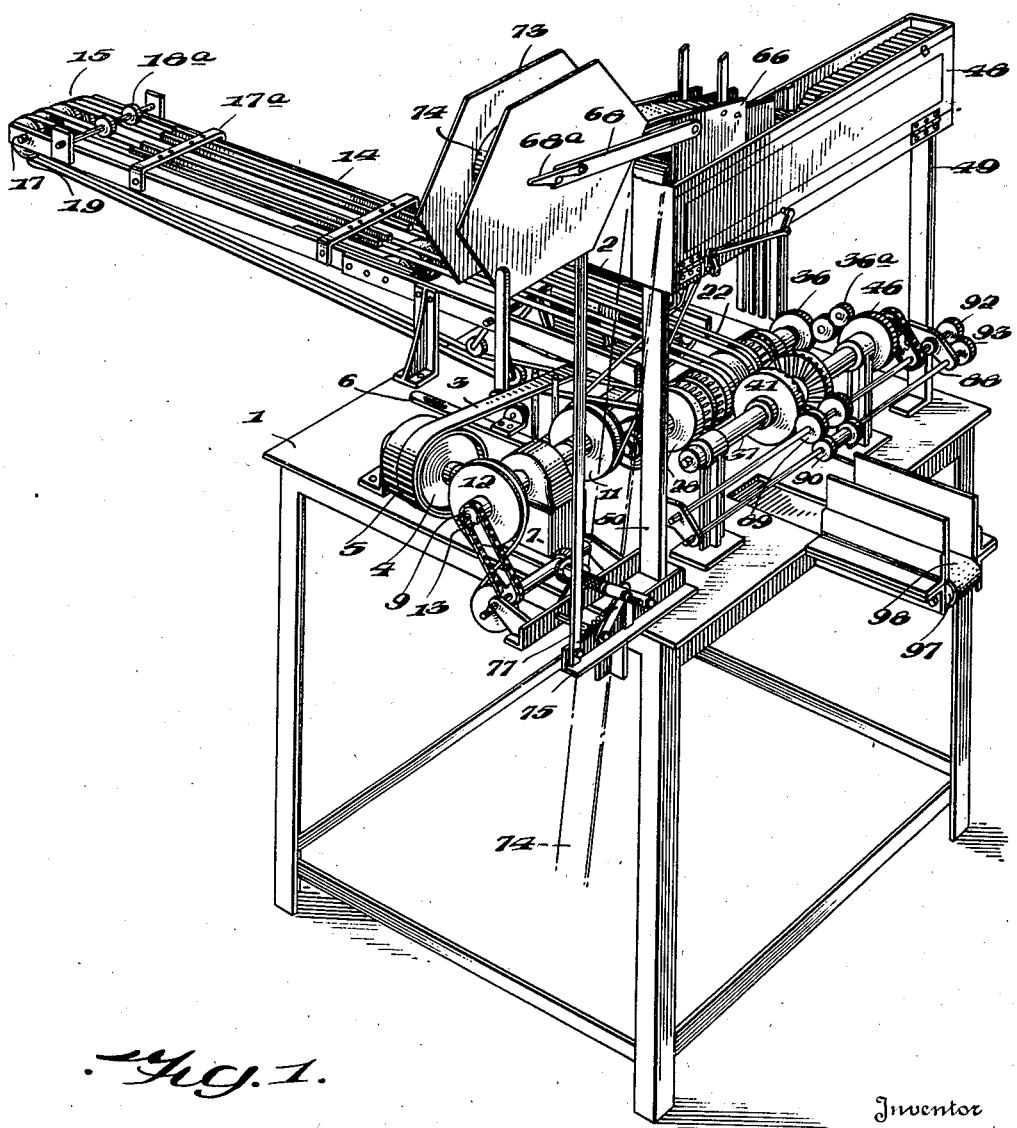
Fig. 1 is a perspective view of the apparatus with parts broken away.

Referring to the drawings, in Fig. 1 there is shown a comprehensive view of an assembling machine. In this figure, the miscellaneous elements comprising one embodiment of the invention, are illustrated, generally, in their operative association with each other.

The assembling machine is mounted on a platform table 1 and is composed of a driving mechanism, bulb conveyors, an assembly mechanism and feed mechanism for tubes.

The driving mechanism, as shown, includes a motor 2 connected by means of belt 3 to a pulley 4. A free pulley 5 is also provided so that by means of belt shifter 6 operation of the machine may be halted without stopping the motor. The pulley 4 is carried on a shaft extending into reduction gear box 7, and thereby drive shafts 8 and 9 extending therefrom. The shaft 8 carries a gear 10 and a pulley 11, while shaft 9 carries a pulley 12 and a sprocket 13, the purpose of which elements will later be described.

The bulb conveyor mechanism 14, and the portions thereof which also form a part of the assembly mechanism, includes feed conveyors 15 extending beyond the table 1, and carrier or positioning conveyors 16. A frame 17, preferably jointed at the table edge, support the conveyors and their immediately related parts. The frame 17, as shown, is in two parts, that which lies over the table 1, and that which extends beyond it, and is formed of four side rail portions, the forward two portions being secured to the table by angle brackets, while the two portions extending beyond the table are bolted or otherwise joined to the forward portions. The conveyor elements, as well as other portions of the complete machine, except the tube reservoir, reservoir supply means, and the driving apparatus, are shown in a tandem arrangement.

The conveyors 15, as shown, include endless belts 18 extending over the central grooves of triplex pulleys 19 disposed at the outer end of the frame 17, and over the central grooves in triplex pulleys 20 at an intermediate point on the frame. At points adjacent the inner and outer ends of the portions of frame 17 which extends beyond the table, and extending above said portions, spacer members 17a are secured to maintain the parallel relation of the frame rail members. These members 17a also serve to support guide members 21, which are secured dependent therefrom at each side of each of the belts 18 for the greater portion of the distance between pulleys 19 and 20. These guides serve to maintain the position of bulbs which, as later described, are initially placed on the belts 18 by the machine operator. The guide members as shown, are merely narrow strips of metal held in edgewise relation to the clamps 17a by screws or other suitable means. Between the clamp and the pulley 19 are disposed idler pulleys 18a which depress the endless belts 18 and maintain their tension.

The conveyors 16, as shown, include the parallel belts or tapes 22 and 23, passing around duplex pulleys 24 at the inner end of the frame 17 and around the outer grooves of the triplex pulleys 19. The idler mechanism 25 beneath the frame 17 maintains the required tension on the belts 22 and 23. This mechanism may be of any conventional form, but as shown, it consists of a shaft carried by the frame 17 from which pivotally depend a series of arms each provided with a pulley wheel at its lower end, the pulley wheels engaging the belts 22 and 23, and by the weight of the pulley wheels and arms maintaining a tension on the belts which is sufficient to prevent whipping or slipping thereof. Support for the upper portion of the belts 22 and 23 is obtained from the outer portion of the pulley 20 over which the belts pass. As an alternate arrangement, it is possible to have the belts 22 and 23 encircle the pulleys 20 being disposed in the two outer grooves of each, and in such case, the idlers 25 are usually not required.

The assembly mechanism is disposed at the inner end of the positioning conveyors 16 and below the feed mechanism for tubes. The assembly mechanism includes a shaft 26 carried by and extending outwardly beyond supports 27 at each end. Cam members 28 are secured to the inner side of each of the supports 27, and between the cam members are disposed the duplex pulleys 24 and plunger guides 32. The shaft 26, in addition to driving the conveyor mechanism, provides the means whereby motion is transmitted to the balance of the assembly mechanism. At the one end of the shaft 26 a gear 35 meshes with gear 10 on shaft 8. On the other end of the shaft 26, a gear 36, driving through a gear train 36a, transmits motion to a gear 46 mounted on a shaft 37.

The shaft 37 is mounted on supports 38 and 39, and carries that portion of the assembly mechanism directly associated with the feed mechanism for tubes. Mounted midway of the shaft 37 between the supports 38 and 39, are tube carriers 40 and 41 spaced from each other by their hubs so that the edge of each carrier is opposed to substantially the center line of one of the duplex pulleys 24. On the outer face of each carrier radial grooves 40a and 41a extend inwardly, terminating at the hub. Spaced from the grooved surface of each tube carrier are tube retainer discs 44. Each disc has a radial tube slot 45, see Fig. 8, disposed in substantially parallel relationship with the top of the table 1. Between the tube retainer discs 44 and the supports 38 and 39, are sleeves 43 and 42, respectively. The sleeves are grooved and slotted in the manner and for the purpose later to be described. The tube retainer discs 44 and the sleeves 42 and 43 are mounted in fixed relationship to the tube feed mechanism, having central openings through which the shaft 37 passes, and in which the shaft is free to rotate. On the far side of the support 38, the gear 46, mounted on the shaft 37, is driven in the manner previously described. On the extreme end of shaft 37, and separated from the gear 46 by a fixed sleeve, is mounted a sprocket 47.

The tube feed mechanism includes a tube case 48 supported above the table 1, at the assembly end, by means of legs 49 and 50. In the floor of the case are two openings partially closed by two sets of rollers 51 and 52. As shown, these roller members 51 and 52 are each provided with flattened portions which in the assembly are disposed in opposed relation, providing a space between each pair, large enough to permit passage of a tube. The rollers are carried on shafts supported by the lower portion of the case which extends downward beyond the floor. Dependent from the floor at the openings are two tube-chutes 53 and 54 extending downwardly and curving toward each other at their lower ends. The lower ends of the tube-chutes engage the slotted portions of the sleeves 42 and 43, to prevent rotation of the sleeves 42 and 43 on the shaft 37, and terminating at and opening through the discs 44 through the horizontal slot 45, to the edges of which the chute ends are secured as by soldering or other conventional means. If desired, discs 44 may be attached to the sleeves 42 and 43 by screws extended through the discs into the body of the adjoining sleeves, the screw heads being let into the surface of the discs to provide a smooth contour. The rollers disposed in the openings at the upper end of the tube-chutes are connected to each other by means of links 55 and lever arms 56. The outer end of the inner roller 51 carries a lever arm 57 connected by link 58 to a lever on the outer end of a bevel gear shaft 59, supported beneath the floor of the case 48. The bevel gear 60 on the shaft 59 meshes with a second bevel gear 61 on shaft 62, which shaft is driven by means of pulley 63 through belt 64 and pulley 11 on shaft 8. An idler pulley 65 supported by leg 50 maintains tension on the belt 64.

On the upper edges of the tube case 48 above the leg 50, frame members 66 and 67 pivotally support the inner end of arms 68 and 69. A curved tape guide 70 is also pivotally supported between the frame members and extends downwardly into the case 48. A roller 71 is carried at the inner end of the tape guide 70 and a second roller 72 is mounted at the edge of the case 48 between the frame members 66 and 67. A fixed support 78 is secured at one end to the frame members 66 and 67. On the support 78 rests a spool 73 on which is wound a corrugated tube-tape 74, in the corrugations of which are disposed the tube members supplied to the case 48.

The spool is provided with an axle, the ends of which are engaged by the outer ends of the arms 68 and 69.

Adjacent the leg 50, the table 1 carries angle iron arms 75 and 76, extending outwardly beyond the table edge. Arm 75 supports an upright 77 which in turn provides support for the outer end of the member 78. The arms 75 and 76 also support knurled rollers 79 and 80, of which roller 79 is movably mounted by means of the lever 81 and may be pressed tightly against the roller 80 by means of the latch 82. The roller 80 is fixed to a shaft extending through the arm 76 and carrying a bevel gear 83 which meshes with a similar gear mounted on the shaft 84, carried by supporting bearings 84a on the arm 76. The shaft 84 is driven by a sprocket 85 connected by a chain 86 to the sprocket 13 on shaft 9.

Also supported on the legs 49 and 50, above the table 1, and at approximately the level of the end of tube-chutes 53 and 54, shafts 87 and 88 carry fibrous discs 89 and rollers 90. The discs 89 are of such diameter as to provide for contact with the end of the tubes leaving the chutes 53 and 52 or just entering the tube carriers 40 and 41. A reservoir 91 is disposed immediately below the shaft 88. Liquid in the reservoir 91 is picked up by the rollers 90, partly immersed therein, and is transferred to the fibrous discs 89 through contact between the edges of the discs and rollers. Shaft 88 is driven by means of a sprocket 94 connected by a chain 95 to the sprocket 47 on shaft 37. Both shafts 87 and 88 extend beyond their supports on leg 49 and carry inter-meshing gears 92 and 93, by means of which motion is transmitted to the shaft 88.

Beneath the table a conveyor belt 98, passing over pulleys 97 and 99, is driven by means of the shaft 96 on which the pulley 97 is mounted. The shaft 96 is in turn driven through a pulley 101 by means of the belt 100 connected to pulley 12 on shaft 9 of the driving mechanism. The conveyor belt 98 receives the assembled articles from the assembly mechanism through a slot in the table top and the belt extending beyond the edge of the table conveys these articles to a receptacle therefor.

The apparatus thus generally illustrated in Fig. 1 and described above, is more specifically shown in the remaining drawings in which like parts are identified by the same numerals as in Fig. 1. For the most part, Figs. 2 to 24 inclusive, illustrate the specific details of the elements of which the assembly machine is composed or enlarged views of the interrelationship of such elements. In addition, some of the figures illustrate preferred auxiliary equipment forming a part of the present invention.

Fig. 2 provides a view of the apparatus from the assembly end, showing in greater detail the structure of the tube case 48, and curved tape guide 70, the spool 73 and its supporting mechanism. Also clearly illustrated are the tube-chutes 53 and 54, and the relation of these parts in the assembly mechanism.

As shown, the case 48 is supplied with tubes from the tube-tape 74 which may be of corrugated paper or a similar material having a surface adapted to partially encircle each tube, and flexible so as to permit winding of the tape and tubes on a spool, such as spool 73.

The spool 73 is frictionally supported on the support 78 and is maintained in fixedly spaced relation to the case 48 by means of arms 68 and 69, slotted at their outer ends to engage an axle for the spool 73, and having latches such as indicated at 68a. The tape 74 passes over the tube-tape guide into the case 48, reverses its direction over the roller 71, and passing out of the case 48 over roller 72, extends downwardly between the knurled rollers 79 and 80, shown in Figs 1, 4, and 28 to 32, inclusive. In Fig. 2, the means for driving these rollers is more clearly illustrated. In addition, the driving connection between the gear box 7 and the means for operating the roller closures 51 and 52 for the tube-chutes 54 and 53, is more clearly shown as well as the means for driving the belt conveyor 98.

In Fig. 3, an illustration of the apparatus from the driving side, the principal driving elements are illustrated in the absence of those parts of the apparatus not directly included in the driving mechanism.

Fig. 4 is a plan view of the apparatus taken along the line IV—IV of Fig. 3, and shows in considerable detail the arrangement and interrelation of the parts described with reference to Fig. 1. Included in this figure is a partial showing of casings 27a and 27b which are secured to the shaft supports 27 and 38, and 27 and 39, respectively. These casings serve to cover the gears at the outer ends of shafts 26 and 37 for a purpose later set forth. Fig. 4 is especially useful in its showing of the manner in which the feed conveyor 15 cooperates with the positioning or carrier conveyor 16.

In Figs. 5, 5—a and 5—b, the idler mechanism for the tape 18 in the feed conveyor 15 is shown in greater detail.

In the enlarged view provided by Fig. 6, the contact between the fibrous disc 89 and the end of the tube entering the radial grooves 40a and 41a is shown. In addition, this figure shows the disposition of bulb spreader and holding members 102 at the point at which the tube and bulb are joined. The figure further shows the manner in which the plunger rods 34 are pressed through the openings therefor in the wheels 29 and 30 of pulley 24, to engage the bulbs on the tapes 22 and 23, and aid in holding the bulbs rigidly during the insertion of tubes from the tube carriers 40 and 41.

As shown in Fig. 7, the bulb holding elements 102, are adjustably mounted on a cross member 103 which in turn is supported at each end by the gear casings 27a and 27b, partially illustrated in Figures 4 and 6. The members 102 are of generally rectangular shape with the lower end slightly bent and slotted to form fingers 105.

In Fig. 8, a view taken along the line VIII—VIII of Fig. 6, the introduction of a tube in one of the grooves 41a of tube carrier 41 into a bulb carried by the bulb tapes 23, is clearly indicated. The cross sectional view provided by this figure, also shows the manner in which the tubes are introduced into the radial grooves of the tube carriers through slots 45 of the tube retainer discs 44. There is also shown the roller-bar idler 106, by means of which the bulbs are firmly seated in the space between the tape 23 just prior to their engagement by the plunger rod 34. Each of the two idler bars shown is composed of a thin flat strip of metal pivotally mounted on shaft 107 at the forward end, the shaft extending transversely of the conveyor belts 22 and 23, and supported at each end by supports 104 secured to the upper surface of gear casings 27a and 27b. The bars are so disposed with relation to the belts as to parallel and be in a vertical plane with a line through the center of the space between the belts. Each bar is provided with a plurality of small discs or rollers, rotatably mounted on pins disposed in staggered relation along each side of the bar. The rollers are of such diameter and so mounted as to extend beyond the lower edge of the bars. The outer end of each of the bars 106 is supported by means of the angular bracket arms 108, which are carried by the frame 17. These elements are also shown in greater detail in Figs. 23 and 24. Immediately below the assembly mechanism, a chute 109 is disposed for the purpose of catching broken tubes or bulbs which have failed to be engaged by a tube member in the carriers 40 or 41. Properly assembled articles fall from the tube carriers at a lower point in the rotation thereof and are received by the belt 98.

In Fig. 9 is illustrated the appearance of a tube carrier such as 41, showing the slots 41a and their disposition on the face of the carrier.

In Figs. 10, 11 and 12, the duplex pulleys 24 are more clearly illustrated. As shown, these pulleys are formed of two wheels 29 and 30, of which the outer wheel 29 is provided with spaced circumferential openings 31, permitting entrance of the inner end of the plunger rod 34, as shown in Fig. 6. The inner wheels 30 are imperforate and only serve the purpose of carrying the inner one of either of tapes 23 or 22.

The plunger guide wheel construction is shown by Figs. 13, 14 and 15. These wheels 32 are provided with circumferential openings 31, and in assembling the apparatus, the openings 33 in the wheels 32 are aligned with the openings 31 in the wheels 29 of the duplex pulleys 24, the plunger rod 34 being inserted in the openings with a spring member 34a, encircling the plunger rod 34 between the pulley wheels 29 and the guide wheels 30. In the cross sectional view, shown in Fig. 18, this arrangement is illustrated.

Figs. 16 and 17, as previously indicated, are enlarged front and side views of the cam members 28, over which the plungers 34 are drawn by rotation of the duplex pulleys and the plunger guide wheels.

In Figs. 19 and 20, detailed side and end views of the sleeves 42, are provided. The sleeves consist of a hub 42a and a flange 42b. The flange is provided with a radial slot which extends a short distance beyond the junction of flange and hub. The undersurface of the flange adjacent the slot, is undercut to a depth equal to the depth of the slot in the flange, and the hub 42a has a flattened surface corresponding to the bottom of the slot in the flange 42b. This construction of the sleeve is for the purpose of providing a passageway for the lower end of the tube-chutes 53 and 54, as shown in Fig. 6.

Fig. 21 is an enlarged view of one end of the tube case 48 taken from above, and shows in detail the arrangement of the roller closures 51 for the tube-chute 54. In this view the mechanism for operating the closures, as described in connection with Fig. 1, is more precisely illustrated.

Figs. 28–32 are views of the means provided for drawing the tube-tape 74 through the case 48 in order to discharge the contents thereof. As previously mentioned, the roller 80 is the driven roller, while roller 79, movable by means of the lever 81, is adapted to force the tube-tape 74 against the driven roller 80 in such manner as to cause the tape to be drawn downwardly, and through the case 48. The latch 82, pivotally mounted on the arm 75, is adapted to engage a lug on the lever 81 in order to maintain the roller 79 in its operating position against the roller.

In Figs. 22 and 23 are shown side elevational and top plan views of the roller-bar idlers 106, and in these figures the mounting of the idlers on the support 104, as described in connection with Fig. 8, is more clearly shown. These figures also illustrate the manner in which the cross member 103 carrying bulb holding elements 102, and the support 104 are supported by the gear casings 27a and 27b.

In utilizing the apparatus, according to the present invention, after having mounted a spool of loaded tube-tape on the frame provided therefor, the tape is threaded over the curved tape guide 70, around the roller 71, and over the roller 72, to be drawn downwardly between the knurled rollers 79 and 80. The roller 79 is then clamped against the tape by means of the lever 81 and latch 82. In starting the operation, it is customary to partially fill the tube case 48 so that no time will be lost in waiting for the supply from the tube-tape 74 to fill the chutes 53 and 54. With the case full, or partially filled, the arcuate motion of rollers 51 and 52, agitates the tubes directly above them in such manner that the tubes tend to fall or roll into the passage provided when the flattened portions of the rollers come into opposition, and thus enter the tube chutes 53 and 54 by gravity. In addition, the movement of the tube tape 74 through the case tends to distribute the mass of tubes more or less evenly throughout the case, and to some extent provide additional agitation which facilitates their movement toward and into the tube chutes 53 and 54. The feed rate of tubes from the tube-tape is such that it generally slightly exceeds the rate at which the tubes and bulbs are assembled by the machine and therefore the supply of tubes in the case 48 is always maintained. At intervals, it may be necessary to stop the feeding of additional tubes to the case, but this is easily done by releasing the pressure of roller 79 against the tube-tape. It is possible, of course, to so adjust the feed rate of the tube-tape as to maintain an equilibrium between the number of tubes supplied to the case and the tubes withdrawn therefrom through the chutes 54 and 55.

When the tube case 48 and the chutes 54 and 55 have been adequately filled with tubes, the machine operator places a succession of bulbs on the carrier tapes 18 between the guide members 21. The bulbs are placed on the tapes with the flanged or open end facing to the rear. The tapes 18 carry the bulbs forward until, passing beyond the pulleys 20, the bulbs are picked up by the tapes 22 and 23. The bulbs are supported between the respective pairs of tapes by means of their flanged portions, with the upper portion of the bulb extending downwardly between the tapes, and the opening in the bottom of the bulbs facing upward and outward. In this position, the bulbs move forward with the tapes 22 and 23, and passing beneath the roller-bar idler 106 by means of which the bulbs are firmly seated between the tapes. As the bulbs, supported by the tapes, enter into the space between the pulley wheels 29 and 30 of pulleys 24, the plunger rods, carried between the wheels 30 and plunger guide wheels 32, are forced forward by the contact of the outer end of the rod with the raised surface of the cam members 28, and enter the spaces between the downwardly depending bulb tops as separated by the flanged bottom portions thereof. As the bulb moves downward over the circumference of the pulleys 24, the plunger rod 34 operates to maintain the position of the bulbs on the tapes 22 and 23 until they are engaged by the bulb holding elements 102. The space between the elements 102 and the tapes 22 and 23 is so adjusted as to cause the outer edges of the flanged portion of the bulb to be slightly compressed by the fingers 105 of the bulb holding members 102. Compression of the outer edges of a bulb causes the center portion to bulge outwardly between the fingers 105, and in so doing the mouth or opening of the bulb is distorted and expanded sufficiently to facilitate introduction of a tube from one of the radial grooves in the tube carriers 40 and 41. The inserted tube carried downward by the carriers 40 or 41 exerts sufficient pressure upon the bulb to assist in drawing it past the fingers 105.

The tubes from case 48, being metered through the opening in the bottom of the case by means of the paired rollers 51 and 52, pass downwardly through the tube-chutes 54 and 55 and emerge through the radial slots 45 in the tube retainer discs 44. As the tube carriers 40 and 41, turned by means of the shaft 37, the radial grooves 40a and 41a are brought into collateral relation with the slots 45 in the retainer discs 44, permitting tubes to drop from the tube-chutes 54 and 55 into the grooves. Also, as the tube carriers 40 and 41 continue to be rotated inwardly toward the pulleys 24, the upper end of the tubes in the radial grooves 40a and 41a are brought into contact with the fibrous discs 89, which have been moistened with liquid from the reservoir 91 by means of the rollers 90, in order to lubricate the end of each tube and facilitate its introduction into the opening of a bulb. The length of the radial grooves 40a and 41a is such that the tubes inserted therein project beyond the circumference of the tube carriers for approximately such distance as it is desired they shall extend into the bulbs with which they are to be associated.

With rotation of the tube carriers, the tubes are carried downward with the projecting end of the tube extending into the space between the tube carriers and the pulleys 24. At the point of approximate tangential relation between the pulleys 24 and the tube carriers 40 and 41, the space between the carriers and pulleys is slightly greater than the thickness of the flanges on the bulbs carried by the tapes 22 and 23. Accordingly, the projecting end of the tube in the carriers 40 and 41, being longer than the distance between the carriers and the pulleys, tend to extend into the spaces between the pulley wheels 29 and 30, and as the space between the pulley wheels and tapes is occupied by bulbs, the projecting ends of the tubes are forced to enter the openings in the bulbs faced toward them. As the tubes and bulbs are carried toward each other by the counter-rotation of their respective carriers, they approach each other at an angle, the apex of which lies at the point of approximate tangential relation of the carrier members. In this way, the tubes are induced to enter the opening of the bulb in an edgewise fashion, in much the same manner as such entrance must be accomplished in the manual assembly of the elements. Usually the tubes are provided with a projecting lip at the end which is inserted into the bulb opening, and the bulb opening is of slightly smaller diameter than that of the tubes in order to provide for a gripping action when the tube and bulb are assembled. The bulb spreaders 102, against the fingers of which the bulbs are pressed, slightly enlarge the opening in the bulb so that the lubricated end of the tubes passing between the fingers of the spreaders are more easily introduced.

The cam members 28 are so formed and disposed in the mechanism as to provide for the prompt withdrawal of the plunger rod 34 from the space between the pulley wheels 29 and 30, under pressure of their spring members, as soon as the rotating pulley wheels and plunger guides carry the plungers beyond the point of tangential relationship between the carrier members. Thus the bulb, secured to the top end of the tube, is free to disengage itself from the bulb carrier portion of the mechanism, and with the tube be carried downward by the tube carriers 40 and 41, until by gravity the assembled tube and bulb drop from the radial grooves 40a and 41a on to the belt moving beneath the slot in the table top.

Should a tube be broken during or shortly after its insertion into the bulb, the bulb and broken particles of the tube fall from their respective carrier element into the chute provided for that purpose, and are conducted to a point to the rear of and beyond the pulley which drives the belt conveyor for perfectly assembled articles.

The foregoing description has been set forth for the purpose of illustration only, and various changes and alternate arrangements may be made within the scope of the appended claims in which it is intended to claim all novelty inherent in the invention as broadly as the prior art permits.

I claim:

1. In an apparatus for assembling tubular articles, each composed of a body portion unit and a top portion unit telescopically associated therewith, a means for holding and positioning a plurality of top portion units for the insertion of corresponding body portion units, comprising a drive shaft, inner and outer pulley wheels mounted in spaced relation on said shaft, conveyor means for top portion units driven and supported by said pulleys, a plunger guide wheel mounted on said shaft in spaced relation to the outer pulley, a cam member fixedly supported in laterally spaced relation to said guide wheel, a plurality of aligned lateral passageways disposed in spaced relation, circumferentially of said outer pulley and guide wheel, a plurality of plunger rods disposed between said wheels, supported in the aligned passageways in said wheels with the outer ends of said rods extending through the guide wheel and beyond its outer face into intermittent contact with said cam, means for rotating the shaft and wheels, whereby the cam intermittently forces said rods through the aligned passageways, into the space between the pulleys, and spring means for withdrawing the rods from said space.

2. In an assembly mechanism of the class described including a rotatable circular carrier for dropper bulbs, and a circular rotatable carrier for dropper tubes disposed in closely spaced edgewise relation thereto; said carrier for dropper tubes comprising a circular plate mounted for opposed rotational motion with respect to a circular carrier for bulbs, said plate having a hub; a plurality of spaced, radial, semi-circular receptacles in one face of said plate opening outwardly through the plate edge and terminating inwardly at the hub; a fixed tube retainer disc mounted co-axially with said plate in spaced relation thereto, said disc having a radial slot through which tubes are fed into the receptacles in said carrier.

3. In an assembly mechanism of the class described, including a rotating circular carrier for resilient flanged dropper bulbs and a rotatable circular carrier for dropper tubes disposed in closely spaced edgewise relation to each other; a means for expanding the opening in said bulbs during the insertion of a dropper tube, comprising a cross frame member supported above said carrier for bulbs, and a bifurcate member adjustably secured to said cross frame member, the bifurcate portions extending downwardly toward a point of approximate tangential relation to said bulb carrier, and spaced from said bulb carrier by slightly less than the thickness of a bulb flange to compress the outer edge of said flange when engaged thereby.

4. An apparatus for assembling tubular articles, each composed of a body portion unit and a flanged top portion unit telescopically associated therewith, comprising a twin belt conveyor for top portion units, said belts being spaced to support the top portion units by their flanges, a spaced, coupled pulley means supporting said conveyor belts at one end, cam operated plunger means intermittently insertable through one side of said pulley means, toward the other pulley means and in between the top portion units for maintaining movement of the top portion units around the pulley means, a disc-shaped carrier for body portion units disposed in closely spaced edgewise relation to said pulley means opposite the center line thereof, said carrier having a plurality of radial grooves in one face opening out through the carrier edge for receiving and conveying body portion units, said grooves having a length less than that of a body portion unit, a fixed body portion unit retainer disc disposed in spaced relation to the grooved surface of said carrier, said disc having a horizontal radial slot opening therethrough, means for feeding body portion units through said slot and into the grooves of said carrier, and driving means for rotating said pulley and carrier elements in opposed circular motion to bring said units into telescopic engagement.

BERNARD A. SCHMITTER.